(12) United States Patent
Heo et al.

(10) Patent No.: US 11,668,863 B2
(45) Date of Patent: *Jun. 6, 2023

(54) OPTICAL POLYESTER FILM, AND PRISM SHEET OR POLARIZED REFLECTION SHEET COMPRISING SAME

(71) Applicant: SKC CO., LTD., Gyeonggi-do (KR)

(72) Inventors: Young Min Heo, Gyeonggi-do (KR);
Sechul Lee, Gyeonggi-do (KR);
Seungwon Lee, Gyeonggi-do (KR);
Dawoo Jeong, Gyeonggi-do (KR);
Jung Kyu Lee, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 31 days.

This patent is subject to a terminal disclaimer.

(21) Appl. No.: 16/614,258

(22) PCT Filed: May 25, 2018

(86) PCT No.: PCT/KR2018/005940
§ 371 (c)(1),
(2) Date: Nov. 15, 2019

(87) PCT Pub. No.: WO2018/217053
PCT Pub. Date: Nov. 29, 2018

(65) Prior Publication Data
US 2020/0081300 A1    Mar. 12, 2020

(30) Foreign Application Priority Data

May 26, 2017  (KR) .................. 10-2017-0065396
May 26, 2017  (KR) .................. 10-2017-0065480
May 26, 2017  (KR) .................. 10-2017-0065499

(51) Int. Cl.
*G02B 5/30*  (2006.01)
*G02B 5/04*  (2006.01)
(Continued)

(52) U.S. Cl.
CPC .............. *G02B 5/045* (2013.01); *B29C 55/02* (2013.01); *C08J 7/046* (2020.01); *G02B 1/14* (2015.01);
(Continued)

(58) Field of Classification Search
CPC ...... G02B 5/3033; G02B 5/3083; G02B 5/04; G02B 5/045; G02B 1/14; C09J 7/046;
(Continued)

(56) References Cited

U.S. PATENT DOCUMENTS

2013/0100378 A1*  4/2013  Murata ................ G02B 5/3083
349/61
2013/0335823 A1*  12/2013  Epstein ................ G02B 5/0215
359/489.07
(Continued)

FOREIGN PATENT DOCUMENTS

CN    102959459 A    3/2013
CN    105745561 A    7/2016
(Continued)

OTHER PUBLICATIONS

Office Action issued by Taiwanese Patent dated Jan. 30, 2020.
(Continued)

*Primary Examiner* — Ruiyun Zhang
(74) *Attorney, Agent, or Firm* — IP & T Group LLP

(57) ABSTRACT

An embodiment relates to an optical polyester film. The optical polyester film according to one embodiment can minimize the difference between the orientation angle at the center and the orientation angle at the end of the film while producing a difference between the tensile strengths in the
(Continued)

lengthwise/widthwise directions of the film, thereby increasing mechanical strength and brightness and suppressing the occurrence of polarization Mura defects. Further, the optical polyester film employs a single layer film, and thus is more easily processed and has a slimmer thickness. Therefore, the optical polyester film can be usefully applied to small-sized thin film display devices and, specifically, can be favorably used as a substrate material of a prism sheet or a polarized reflection sheet.

6 Claims, 3 Drawing Sheets

(51) Int. Cl.
| | |
|---|---|
| G02F 1/1335 | (2006.01) |
| G02F 1/1337 | (2006.01) |
| C08J 7/046 | (2020.01) |
| G02B 1/14 | (2015.01) |
| B29C 55/02 | (2006.01) |
| B29C 55/12 | (2006.01) |

(52) U.S. Cl.
CPC ............ *G02B 5/04* (2013.01); *G02B 5/3033* (2013.01); *G02B 5/3083* (2013.01); *G02F 1/133536* (2013.01); *G02F 1/133711* (2013.01); *B29C 55/12* (2013.01); *C09K 2323/03* (2020.08); *C09K 2323/031* (2020.08); *C09K 2323/035* (2020.08)

(58) Field of Classification Search
CPC ... B29C 55/12; B29C 55/02; G02F 1/133536; G02F 1/133711; C09K 2323/03; C09K 2323/031; C09K 2323/035

USPC .......... 359/489.11; 428/1.3, 1.31, 1.33, 141, 428/142; 349/112, 117
See application file for complete search history.

(56) References Cited

U.S. PATENT DOCUMENTS

2016/0062012 A1* 3/2016 Shin ...................... G02B 5/3033
428/1.31
2018/0356564 A1* 12/2018 Jeong ...................... B32B 27/36

FOREIGN PATENT DOCUMENTS

| | | |
|---|---|---|
| JP | H04-257418 | 9/1992 |
| JP | 2007-55217 | 3/2007 |
| JP | 2014-505904 | 3/2014 |
| KR | 10-2007-0028826 | 3/2007 |
| KR | 10-2013-0051825 | 5/2013 |
| KR | 10-2016-0028594 | 3/2016 |
| KR | 10-2016-0077564 | 7/2016 |
| WO | WO-2017091031 A1 * | 6/2017 ....... G02F 1/133528 |

OTHER PUBLICATIONS

Office Action issued by the Chinese Patent Office dated Mar. 1, 2021.
Office Action issued by the Korean Intellectual Property Office dated Sep. 20, 2018.

* cited by examiner

OPTICAL POLYESTER FILM, AND PRISM SHEET OR POLARIZED REFLECTION SHEET COMPRISING SAME

This application is a national stage application of PCT/KR2018/005940 filed on May 25, 2018, which claims priority of Korean patent application number 10-2017-0065396, Korean patent application number 10-2017-0065480, and Korean patent application number 10-2017-0065499 filed on May 26, 2017. The disclosure of each of the foregoing applications is incorporated herein by reference in its entirety.

TECHNICAL FIELD

Embodiments relate to an optical polyester film and a prism sheet or a polarizing reflective sheet using the same.

BACKGROUND ART

The advent of the information age has prompted development and commercialization of various display devices including liquid crystal displays (LCD), plasma display panels (PDP), electrophoretic displays (ELD), and the like. Display devices for indoor uses have become larger in size and thinner in thickness, and portable display devices for outdoor uses have become smaller in size and lighter in weight. Various optical films have been employed in order to further enhance the functions of such displays.

Such optical films are generally required to have such properties as high transmittance, high optical isotropy, defectless surfaces, high heat resistance and moisture resistance, high flexibility, high surface hardness, low shrinkage, good processability, high brightness, high contrast, high luminous efficiency, and the like, depending on the type and/or the use of displays.

In particular, a brightness enhancement film or the like may be used to enhance the brightness, contrast, and luminous efficiency of a display. A reflective polarizing film is mainly used as a brightness enhancement film. In general, a reflective polarizing film is in a form in which a high refractive index layer and a low refractive index layer are alternately and repeatedly laminated. It may be attached to a backlight unit (BLU) by a light shielding tape or the like. Brightness enhancement films commercially available include 3M's Dual Brightness Enhancement Film (DBEF) and the like.

Such a brightness enhancement film, however, has a high surface resistance and is prone to have foreign substances or the like attached to its surface due to the generation of static electricity. In addition, a large-sized liquid crystal display device has a problem that the liquid crystal may be broken by an external electric charge. Further, since the surface hardness of the film is low, the mechanical properties thereof such as resistance to scratch and the like are poor, thereby deteriorating the transparency of the film.

In order to solve such problems, a surface treatment method such as laminating a coating layer on the surface of a film has been introduced. As an example, it has been known that a hard coating layer is coated on one side of a film to strengthen the surface of the film (Korean Laid-open Patent Publication No. 2007-0028826). Although such a surface-treated film can improve the brightness, mechanical properties, and appearance characteristics, however, it involves a restriction when applied to a thin and small display in view of the thickness of the film, which comprises a plurality of layers.

In the meantime, a polyester film, among optical polyester films, used for a prism sheet to be employed in a liquid crystal display device may have a prism pattern layer formed on one side thereof. In such event, if the opposite side of the film on which the prism pattern layer is not laminated is exposed to the air, the refractive index of the side on which the prism pattern layer is laminated differs from that of the opposite surface, whereby the brightness of the film may be deteriorated. As a result, the transmittance of light incident from a backlight may be lowered.

In order to solve such a problem, there has been known a technique in which a protective layer or the like is formed on the opposite side of a polyester film. For example, an adhesive layer having a low refractive index is applied to both sides of a polyester film to improve the transmittance and brightness of the film (Japanese Laid-open Patent Publication No. 2007-55217). Normally, since the refractive index of the protective layer or the like is lower than that of the prism pattern layer, there exists a limitation in the improvement of the brightness of a film.

DISCLOSURE OF INVENTION

Technical Problem

Accordingly, embodiments aim to provide an optical polyester film, which is excellent in mechanical strength and appearance characteristics and has improved brightness without the generation of polarization mura unevenness by minimizing the difference in the orientation angle between the center and the edge of the film while generating a difference between the strengths in the longitudinal/transverse directions of the film.

Solution to Problem

According to an embodiment, there is provided an optical polyester film, which is a uniaxially or biaxially stretched polyester film and has an in-plane retardation of 3,000 nm to 30,000 nm, a tensile strength in the transverse direction (TD) of 25 to 35 kgf/mm$^2$, a tensile strength in the longitudinal direction (MD) of 8.0 to 19 kgf/mm$^2$, a ratio of the tensile strength in the longitudinal direction to the tensile strength in the transverse direction of 0.25 to 0.7, a modulus in the transverse direction of 450 to 560 kgf/mm$^2$, and a modulus in the longitudinal direction of 220 to 380 kgf/mm$^2$.

According to another embodiment, there is provided a prism sheet, which comprises a polyester base film and a prism pattern layer disposed on the polyester base film, wherein the polyester base film is a uniaxially or biaxially stretched polyester film and has an in-plane retardation of 3,000 nm to 30,000 nm, a tensile strength in the transverse direction (TD) of 25 to 35 kgf/mm$^2$, a tensile strength in the longitudinal direction (MD) of 8.0 to 19 kgf/mm$^2$, a ratio of the tensile strength in the longitudinal direction to the tensile strength in the transverse direction of 0.25 to 0.7, a modulus in the transverse direction of 450 to 560 kgf/mm$^2$, and a modulus in the longitudinal direction of 220 to 380 kgf/mm$^2$.

According to still another embodiment, there is provided a polarizing reflective sheet, which comprises a polyester base film and a polarizing reflective layer disposed on the polyester base film, wherein an isotropic resin layer and a birefringent resin layer are alternately laminated in the polarizing reflective layer, and the polyester base film is a uniaxially or biaxially stretched polyester film and has an in-plane retardation of 3,000 nm to 30,000 nm, a tensile strength in the transverse direction (TD) of 25 to 35 kgf/mm², a tensile strength in the longitudinal direction (MD) of 8.0 to 19 kgf/mm², a ratio of the tensile strength in the longitudinal direction to the tensile strength in the transverse direction of 0.25 to 0.7, a modulus in the transverse direction of 450 to 560 kgf/mm², and a modulus in the longitudinal direction of 220 to 380 kgf/mm².

Advantageous Effects of Invention

The optical polyester film according to an embodiment has improved mechanical strength and brightness while suppressing the generation of polarization unevenness by minimizing the difference in the orientation angle between the center and the edge of the film while generating a difference between the strengths in the longitudinal/transverse directions of the film. Further, since the optical polyester film is in a single layer, the process for manufacturing the same is more convenient, and it is thinner in thickness. Hence, it can be advantageously used in a small and thin display device.

BEST MODE FOR CARRYING OUT THE INVENTION

Figure 1:
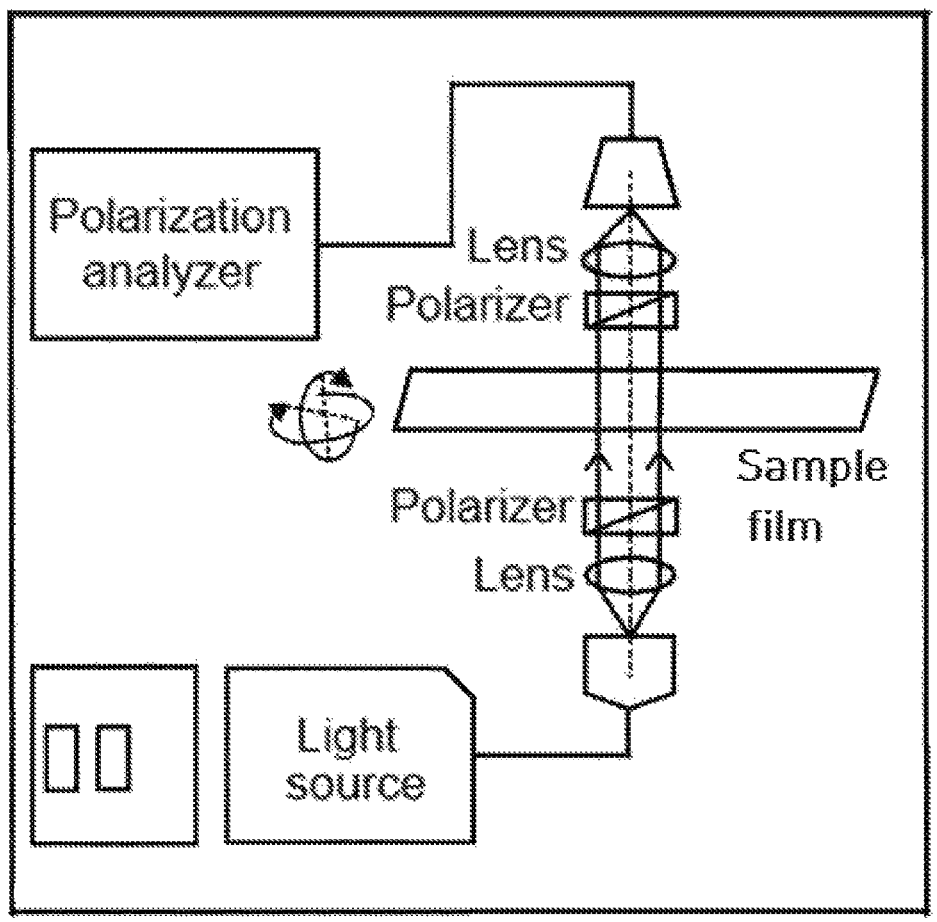
FIG. 1 is a schematic diagram showing the system for measuring an orientation angle as used in Test Example 3.

Hereinafter, the present invention will be described in more detail.

An embodiment provides an optical polyester film, which is a uniaxially or biaxially stretched polyester film and has an in-plane retardation of 3,000 nm to 30,000 nm, a tensile strength in the transverse direction (TD) of 25 to 35 kgf/mm², a tensile strength in the longitudinal direction (MD) of 8.0 to 19 kgf/mm², a ratio of the tensile strength in the longitudinal direction to the tensile strength in the transverse direction of 0.25 to 0.7, a modulus in the transverse direction of 450 to 560 kgf/mm², and a modulus in the longitudinal direction of 220 to 380 kgf/mm².

The optical polyester film is a film comprising a polyester resin, for example, a polyethylene terephthalate (PET) resin. It may have been stretched by 4.0 times or more in the transverse direction and/or by 3.0 times or less in the longitudinal direction. In detail, it may have been stretched by 4.0 times to 8.0 times, 4.1 times to 6.1 times, or 4.1 times to 6.0 times in the transverse direction. It may have been stretched by 1.0 time to 3.0 times, 1.2 times to 1.7 times, or 1.2 times to 1.5 times in the longitudinal direction.

The optical polyester film stretched at the above-mentioned ratios may have a deviation (or optical axis) in the orientation angle of ±2.8 degrees or less in its entire width. In detail, it may have a deviation in the orientation angle of ±0.5 to ±2.8 degrees or ±0.5 to ±2.5 degrees. As the deviation in the orientation angle approaches 0 degree, the brightness of the film is improved. If the optical polyester film has a deviation in the orientation angle within the above range, it is possible to prevent a color distortion phenomenon by suppressing the generation of polarization unevenness, while improving the brightness of the film by 5% or more.

In order to improve the mechanical strength of the film, the following method may be used. Specifically, a method of increasing the stretching load (i.e., stress) may be used at the time of stretching. If the stretching temperature is lowered to reduce the amount of preheating applied to a PET film when the film is stretched in the longitudinal direction and/or in the transverse direction, the stress applied thereto increases and the tendency of crystals to be oriented increases, whereby the mechanical strength of the film can be improved. More specifically, the film has a tensile strength in the longitudinal direction of 8.0 to 19 kgf/mm² and a tensile strength in the transverse direction of 25 to 35 kgf/mm². The ratio of the tensile strength in the longitudinal direction to the tensile strength in the transverse direction may be 0.25 to 0.7, 0.25 to 0.6, 0.25 to 0.4, or 0.25 to 0.35. Further, the film may have a modulus in the transverse direction of 450 to 560 kgf/mm² or 500 to 550 mm², and a modulus in the longitudinal direction of 220 to 380 kgf/mm², 220 to 280 kgf/mm², or 220 to 270 kgf/mm².

In addition to the above, a method of crystallizing the film by elevating the thermal treatment temperature (or TMS temperature) upon heat setting after the stretching may be used. If the TMS temperature is elevated, the crystal growth in the film is accelerated and the amount of crystals is increased as well, so that the mechanical strength of the film can be improved.

The film may have an in-plane retardation of 3,000 nm or more, 7,000 nm or more, or 7,000 nm to 30,000 nm.

Further, the film may have a deviation in the retardation of 500 nm/m or less. In detail, the deviation in the retardation may be 10 nm/m to 300 nm/m or 10 nm/m to 200 nm/m. The "deviation in the retardation" refers to the difference between the maximum value and the minimum value of the in-plane retardation (Re) with respect to the entire width of the film. If the film has a retardation and a deviation in the retardation within the above ranges, a color distortion phenomenon such as rainbow strains can be prevented.

The film may have a thickness of 30 to 300 μm, 30 to 200 μm, 60 to 200 μm, 60 μm to 190 μm, 80 μm to 200 μm, 80 μm to 190 μm, or 80 μm to 188 min. If the thickness is within the above range, the film can be advantageously used in a small and/or thin display device.

In addition, the film may have a thermal shrinkage in the longitudinal direction of 0.05 to 0.6% or 0.05 to 0.3%, and a thermal shrinkage in the transverse direction of 0.05 to 0.6% or 0.05 to 0.3%, when measured for 24 hours at 85° C. for a sample of the film in a size of 200 mm×200 mm.

Further, the film may have an elongation at breakage of about 7% to about 20% in the longitudinal direction and an elongation at breakage of about 75% to about 100% in the transverse direction. Since the polyester film has elongations at breakage within the above ranges, it may have a smooth cut surface.

In addition, the polyester film may have an orientation angle within about ±50 with respect to the transverse direction. In more detail, the polyester film may have an orientation angle (or optical axis) within about ±30 with respect to the transverse direction. In more detail, the polyester film may have an orientation angle within about ±2° with respect to the transverse direction. If the polyester film has an orientation angle within the above range, a polarizing plate to which the polyester film has been applied may have improved polarization and brightness. In particular, the smaller the deviation between the orientation angle and the transverse direction is, the more the polarizing direction of the polarizing plate and the orientation angle of the polyester film coincide with each other. In such case, the polarizing plate according to an embodiment may have improved brightness and polarization.

The optical polyester film according to an embodiment may be prepared according to the process as described below.

First, a resin that can be used as a raw material for a film such as a polyester resin, for example, a PET resin is melt extruded to produce an unstretched sheet. Then, the unstretched sheet is stretched in the transverse direction and stretched in the longitudinal direction, to thereby prepare a film.

Specifically, the PET resin may be directly prepared by carrying out an esterification reaction and a polymerization reaction of a diol component such as ethylene glycol and a dicarboxylic acid component such as terephthalic acid. Or a commercially available resin may be purchased for use. The resin may be melt extruded and then cooled to produce an unstretched sheet. The unstretched sheet may be stretched in the transverse direction by, for example, 4.0 times or more, 4.0 times to 8.0 times, 4.1 times to 6.1 times, or 4.1 times to 6.0 times, and stretched in the longitudinal direction by, for example, 3.0 times or less, 1.0 times to 3.0 times, 1.2 times to 1.7 times, or 1.2 times to 1.5 times. Further, in the step of stretching in the transverse direction, the stretching speed in the transverse direction may be 200%/min to 800%/min, 250%/min to 600%/min, or 250%/min to 300%/min.

The melt extrusion may be carried out at a temperature of Tm+30° C. to Tm+60° C. If the melt extrusion is carried out at a temperature within the above range, the melting can be smoothly performed, and the viscosity of the extrudate can be properly maintained. In addition, the cooling may be carried out at a temperature of 30° C. or lower. Specifically, the cooling may be carried out at 15 to 30° C.

The stretching temperature may be in the range of Tg+5° C. to Tg+50° C. The lower the stretching temperature, the better the extrudability. But breakage of a film may occur. In particular, the stretching temperature may be in the range of Tg+10° C. to Tg+40° C. for the improvement of brittleness. For example, the stretching temperature in the longitudinal direction is 75 to 85° C., and the stretching temperature in the transverse direction is 80 to 120° C. The stretching can be carried out while the temperature is elevated stepwise within these ranges.

Further, the above process may further comprise heat setting the stretched film. For example, the heat setting temperature may be 180° C. to 230° C. The heat setting time may be 1 minute to 2 minutes. The film is relaxed in the longitudinal direction and/or in the transverse direction (at a relaxation rate of 2 to 4%) after the heat setting is initiated. Then, the temperature is lowered to 100 to 150° C. stepwise, to thereby prepare a film.

According to the preparation process as described above, it is possible to prepare a film, which has a proper thickness and a low in-plane retardation, so that it has improved brightness and mechanical strength without the generation of polarization unevenness. In addition, the film according to an embodiment may comprise various additives such as ordinary electrostatic charge, antistatic, antiblocking agents, and other inorganic lubricants within the ranges that do not impair the effect of this embodiment.

Figure 2:
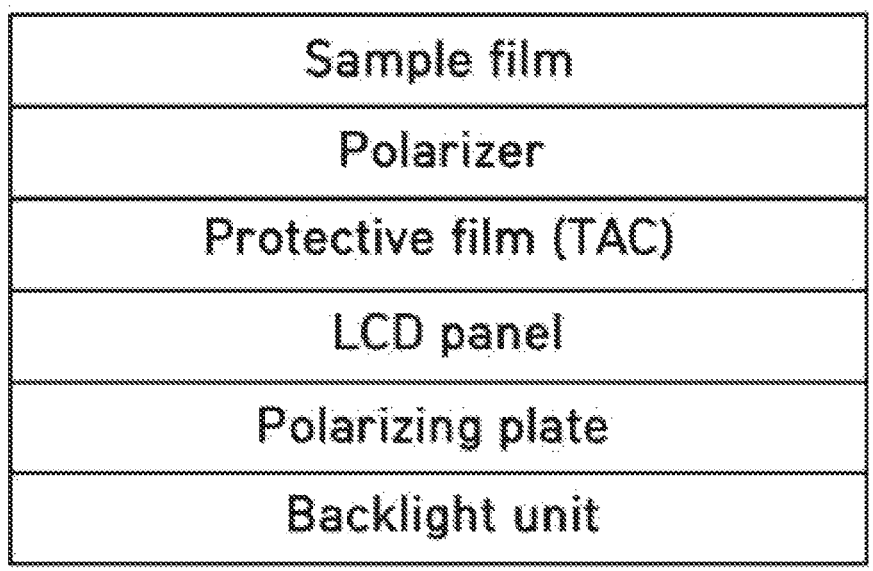
FIG. 2 is a schematic diagram showing a film (i.e., a sample film) employed in a display device for the purpose of checking whether polarization unevenness is observed in Test Example 5.

In an embodiment, the optical polyester film may be applied to a polarizing plate. The polarizing plate comprises a polarizer and a protective film for a polarizer adjacent to at least one of the upper and lower sides of the polarizer. Specifically, as depicted in FIG. 2, the polyester film according to an embodiment may be applied as a polarizer protective film onto the viewer side of the polarizer. In addition, a tri-acetyl-cellulose film (or a TAC film) may be applied as a polarizer protective film onto the side of the polarizer opposite to the polyester film.

The polarizer polarizes the natural light, which oscillates in various directions, incident on the polarizing plate to light oscillating only in one direction.

The polarizer may be made of, for example, a polyvinyl alcohol (PVA) that has been dyed with iodine or the like. The polyvinyl alcohol molecules contained in the polarizer may be arrayed in one direction.

The polarizing plate may be applied to a display device such as a liquid crystal display device or an organic electroluminescent display device.

The display device may comprise a display panel and the polarizing plate disposed on at least one of the upper and lower sides of the display panel.

Figure 3:
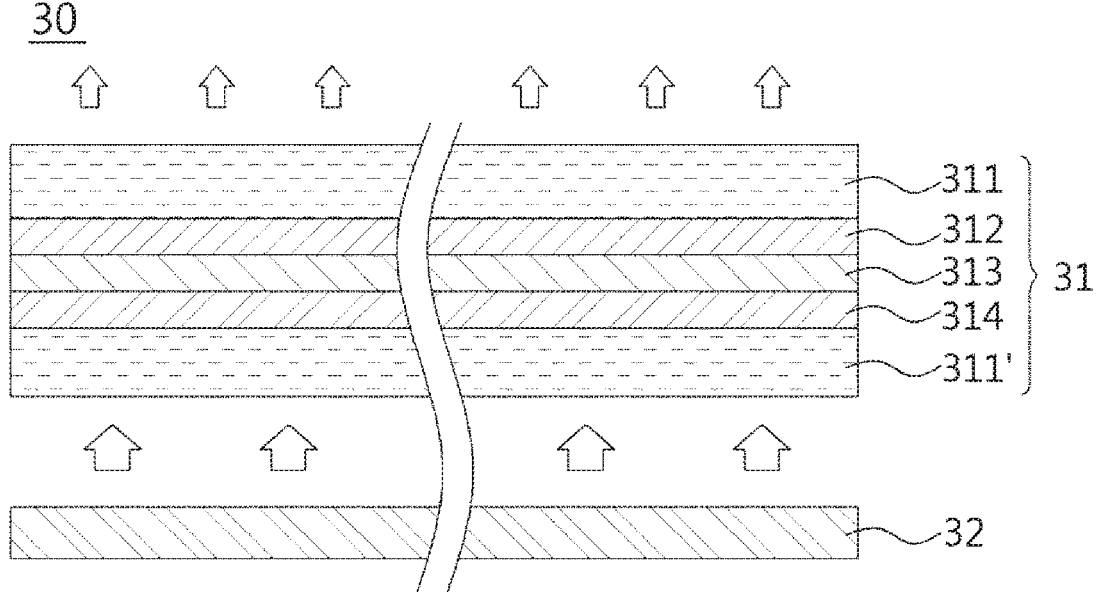
FIG. 3 is a schematic diagram of a liquid crystal display device comprising a polarizing plate according to an embodiment.

FIG. 3 is a schematic diagram of a liquid crystal display device (30) as an example of a display device that comprises the polarizing plate according to an embodiment.

The liquid crystal display device comprises a liquid crystal panel (31) and a backlight unit (32).

The backlight unit (32) emits light to the liquid crystal panel (31). The liquid crystal panel (31) displays an image using the light emitted from the backlight unit (32).

The liquid crystal panel (31) comprises an upper polarizing plate (311), a color filter substrate (312), a liquid crystal layer (313), a TFT substrate (314), and a lower polarizing plate (311').

The TFT substrate (314) and the color filter substrate (312) are disposed to face each other.

The TFT substrate (314) may comprise a plurality of electrodes that correspond to respective pixels, thin film transistors connected to the electrodes, a plurality of gate wires that apply driving signals to the thin film transistors, and a plurality of data wires that apply data signals to the electrodes via the thin film transistors.

The color filter substrate (312) comprises a plurality of color filters that correspond to respective pixels. The color filters function to filter transmitted light, thereby showing red, green, and blue colors. The color filter substrate may comprise a common electrode facing the electrodes.

The liquid crystal layer (313) is interposed between the TFT substrate (314) and the color filter substrate (312). The liquid crystal layer (313) may be driven by the TFT substrate (314). In more detail, the liquid crystal layer (313) may be driven by an electric field applied between the electrodes and the common electrode. The liquid crystal layer (313) may adjust the polarization direction of light that has passed through the lower polarizing plate (311'). That is, the TFT substrate (314) may control the differences in potential between the electrodes and the common electrode in a pixel unit. Thus, the liquid crystal layer (313) may be driven so as to have different optical characteristics in a pixel unit.

The upper polarizing plate (311) is disposed on the color filter substrate (312). The upper polarizing plate (311) may be bonded to the upper side of the color filter substrate (312).

The lower polarizing plate (311') is disposed under the TFT substrate (314). The lower polarizing plate (311') may be bonded to the lower side of the TFT substrate (312).

The polarization direction of the upper polarizing plate (311) may be the same as, or perpendicular to, that of the lower polarizing plate (311').

Figure 4:
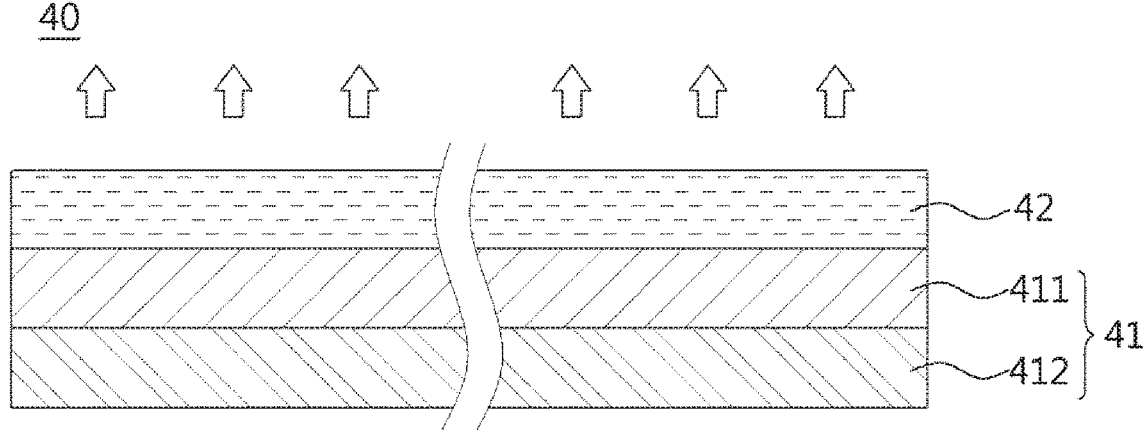
FIG. 4 is a schematic diagram of an organic electroluminescent display device comprising a polarizing plate according to an embodiment.

FIG. 4 is a schematic diagram of an organic electroluminescent display device (40) as an example of a display device that comprises the polarizing plate according to an embodiment.

The organic electroluminescent display device (40) comprises a front polarizing plate (42) and an organic EL panel (41).

The front polarizing plate (42) may be disposed on the front side of the organic EL panel (41). In more detail, the front polarizing plate (42) may be bonded to the side of the organic EL panel (41) where an image is displayed. The front polarizing plate (42) may have substantially the same configuration as that of the polarizing plate as described above.

The organic EL panel (41) displays an image using light generated by itself in a pixel unit. The organic EL panel (41) comprises an organic EL substrate (411) and a driving substrate (412).

The organic EL substrate (411) comprises a plurality of organic electroluminescent units that correspond to respective pixels. The organic electroluminescent units each comprise a cathode, an electron transport layer, a light emitting layer, a hole transport layer, and an anode. The detailed description on the constitution of the cathode and the like is omitted herein.

The driving substrate (412) is operatively coupled to the organic EL substrate (411). That is, the driving substrate (412) may be coupled to the organic EL substrate (411) such that a driving signal such as a driving current may be applied thereto. In more detail, the driving substrate (412) applies current to the respective organic electroluminescent units, thereby driving the organic EL substrate (411).

The optical polyester film according to an embodiment can satisfy the appropriate ranges of the in-plane retardation, tensile strength, and modulus as described above at the same time. That is, the polyester film according to an example has an in-plane retardation of 3,000 nm to 30,000 nm, a tensile strength in the transverse direction of 25 to 35 kgf/mm$^2$, a tensile strength in the longitudinal direction (MD) of 8.0 to 19 kgf/mm$^2$, and a ratio of the tensile strength in the longitudinal direction to the tensile strength in the transverse direction of 0.25 to 0.7. Simultaneously, the film has a modulus in the transverse direction of 450 to 560 kgf/mm$^2$ and a modulus in the longitudinal direction of 220 to 380 kgf/mm$^2$. In addition, the polyester film that satisfies the ranges of the in-plane retardation, tensile strength, and modulus as described above may have an orientation angle within about ±50 with respect to the transverse direction as well.

Thus, the polyester film may have improved mechanical strength and improved optical performance at the same time. In order to materialize such optical and mechanical properties, the stretching ratio of the polyester film may be, for example, 3.0 times or less, 1.0 times to 3.0 times, 1.2 times to 1.7 times, or 1.2 times to 1.5 times in the longitudinal direction and 4.0 times or more, 4.0 times to 8.0 times, 4.1 times to 6.1 times, or 4.1 times to 6.0 times in the transverse direction. Further, the stretching speed in the longitudinal direction may be 2000% min to 800%/min, 250%/min to 600%/min, or 250%/min to 300%/min. In addition, the stretching temperature in the longitudinal direction is 75 to 85° C., and the stretching temperature in the transverse direction is 80 to 120° C. The stretching may be carried out while the temperature is elevated stepwise within these ranges.

The heat setting temperature may be 180° C. to 230° C., and the heat setting time may be 1 minute to 2 minutes. The relaxation rate is 2 to 4%, and the temperature is lowered to 100 to 150° C. stepwise, to thereby prepare a film.

As described above, the optical polyester film according to an embodiment has improved mechanical strength such as modulus and improved brightness while minimizing the generation of polarization unevenness by minimizing the difference in the orientation angle between the center and the edge of the film while generating a difference between the strengths in the longitudinal/transverse directions of the film. Further, since the optical polyester film is in a single layer, the process for manufacturing the same is more convenient, and it is thinner in thickness. Hence, it can be advantageously used in a small and thin display device.

According to another embodiment, there is provided a prism sheet, which comprises the optical polyester film and a prism pattern layer disposed on the optical polyester film.

The details on the optical polyester film are as described above.

Figure 5:
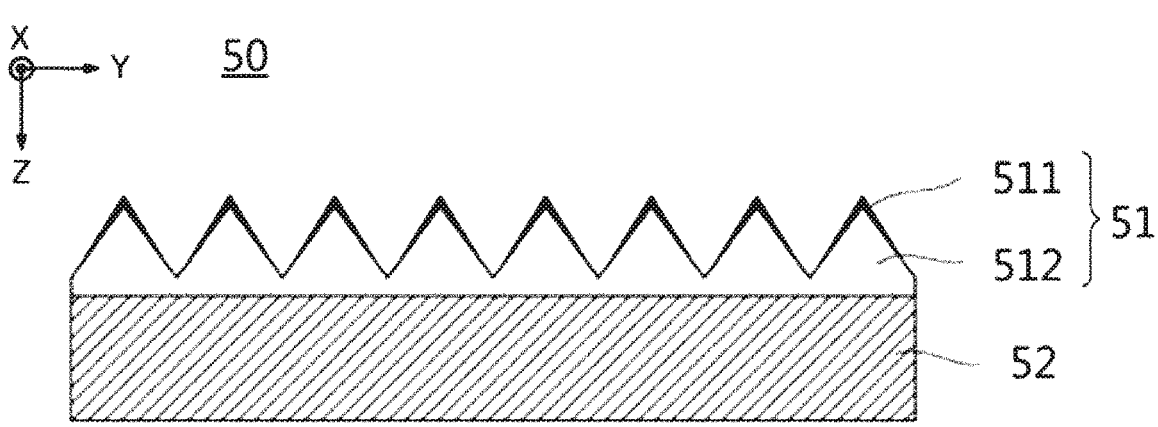
FIG. 5 is a schematic diagram of a prism sheet according to an embodiment.

FIG. 5 is a schematic diagram of a prism sheet (50) according to an embodiment. Referring to FIG. 5, the optical polyester film may be applied to a prism sheet (50) as depicted in FIG. 5. The prism sheet (50) may be provided in a backlight unit of a liquid crystal display device. The prism sheet (50) may collect light incident from an external light source and may comprise a base film (52) and a prism pattern layer (51) formed on the base film (52).

The base film (52) may transmit light incident from an external light source and is the same as the polyester film as described above.

The prism pattern layer (51) may collect light incident from an external light source. The shape of the prism pattern layer (51) is not particularly limited as long as it can collect light incident from an external light source. For example, the prism pattern layer (51) may have a triangular prism shape extending in one direction. Specifically, the prism pattern layer (51) may have two inclined surfaces intersecting with each other and may have a mountain shape extending in one direction. The inclined surfaces may be perpendicular to each other, and the prism pattern may extend in the transverse direction.

Specifically, the optical cross-section of the prism pattern layer (51), that is, the optical cross-section on the YZ plane, may have a triangular shape. In addition, the prism pattern layer (51) may be linearly formed along the X-axis direction, which is the longitudinal direction of the prism pattern layer (51), so that the prism pattern layer (51) may be formed into a triangular prism shape. The prism pattern layer (51) may have a protrusion part (511) protruding relative to the prism pattern layer (51). Here, the prism pattern layer (51) and the protrusion part (511) may be in an integrated form of the same material, but they are not limited thereto.

The protrusion part (511) formed on the prism pattern layer (51) may be formed approximately symmetrically with respect to the floor of the prism pattern layer (51). Specifically, the protrusion part (511) may be formed in a wedge shape along the valley of the prism pattern (512) with respect to the floor of the prism pattern layer (51), but it is not limited thereto.

The width of the protrusion part (511) may be irregular. Here, that the width of the protrusion part (511) is irregular means that the width may be irregular within one protrusion part (511) or that there is a variation in the width between protrusion parts (511). But the width of the protrusion part (511) may be regular. The protrusion parts (511) may be spaced apart from each other, and the space between the protrusion parts (511) may be irregular. But they are not limited thereto.

In addition, the optical polyester film may be applied as a base film of the prism sheet by a process as described below.

Specifically, the optical polyester film as described above is prepared as the base film (52). Then, a polymer resin liquid is applied on the base film (52). Here, any one of a knife coating method, a roll coating method, and a gravure coating method may be used for the application of the polymer resin liquid, but it is not limited thereto.

Thereafter, the polymer resin coated layer is cured. In such event, for the curing of the polymer resin coated layer, for example, ultraviolet rays may be used. And the prism pattern (512) may be formed through the curing step, but the protrusion part (511) may not be formed. That is, the protrusion part (511) may be formed by a process as described below.

Next, the prism sheet (512) may be produced by pressing the prism pattern (512). In such event, the prism pattern (512) is pressed to form the protrusion part (511) on the prism pattern (512) since the protrusion part (511) has not yet been formed through the curing step.

Here, various methods may be used to press the prism pattern (512) to form the protrusion part (511). For example, the protrusion part (511) may be formed by pressing the prism pattern (512) using a mold having a counter shape of the protrusion part (511). Or the protrusion part (511) may be formed by pressing the prism pattern (512) using a sheet having a counter shape of the protrusion part (511). Meanwhile, contrary to the process as described above, the prism pattern (512) and the protrusion part (511) may be formed at the same time.

As described above, the optical polyester film has improved mechanical strength such as modulus and improved brightness while minimizing the generation of polarization unevenness by minimizing the difference in the orientation angle between the center and the edge of the film while generating a difference between the strengths in the longitudinal/transverse directions of the film. Thus, it can be advantageously used as a base film of a prism sheet. Further, since the optical polyester film is in a single layer, the process for manufacturing the same is more convenient, and it is thinner in thickness. Hence, it may be more advantageous for the purpose of producing a smaller and thinner device.

According to still another embodiment, there is provided a polarizing reflective sheet, which comprises a polarizing reflective layer and the optical polyester film disposed on at least one side of the polarizing reflective layer, wherein an isotropic resin layer and a birefringent resin layer are alternately laminated in the polarizing reflective layer.

The details on the optical polyester film are as described above.

Figure 6:
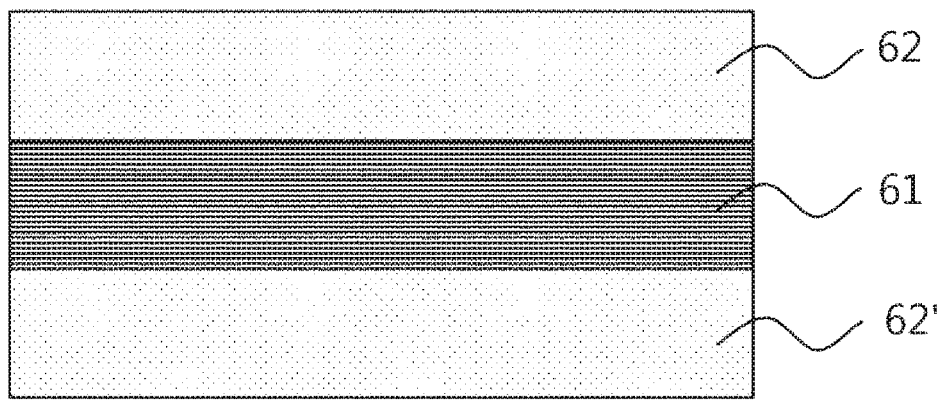
FIG. 6 is a schematic diagram of a polarizing reflective sheet according to an embodiment.

FIG. 6 is a schematic diagram of a polarizing reflective sheet according to an embodiment. Referring to FIG. 6, the polarizing reflective sheet (60) may comprise a polarizing reflective layer (61) and protective films (62, 62') disposed on both sides of the polarizing reflective layer. In such event, the protective films (62, 62') may be the optical polyester film.

In addition, the polarizing reflective layer (61) may be a multilayer stretched film. The multilayer stretched film is composed of a laminated film formed by alternately laminating a first layer and a second layer. It may have been stretched in a uniaxial direction (e.g., x direction). Specifically, the first layer may be a birefringent resin layer, and the second layer may be an isotropic resin layer.

The multilayer stretched film may have a structure in which the first layer and the second layer are alternately laminated. Specifically, the total number of layers of the laminate may be 250 to 1,000. For example, it may be 300 to 500.

The first layer of the multilayer stretched film may be made of a polyester whose refractive index is changed by stretching, and the second layer thereof may be made of a polyester whose refractive index is hardly changed by stretching. As a result, when the first layer is stretched in a uniaxial direction (e.g., x direction), it has a high refractive index in the uniaxial stretching direction (i.e., x direction). The difference in the refractive index between the first layer and the second layer causes optical interference that selectively reflects or transmits light of a specific wavelength, which imparts reflective characteristics to the multilayer stretched film.

For example, a homopolymerized polyethylene naphthalate may be used as the first layer. A copolymerized polyethylene naphthalate having a low crystallinity may be used as the second layer.

In addition, the optical thicknesses of the first layer and the second layer may be ¼ of the wavelength of visible light. Thus, while the film has a reflective ability due to the difference in the refractive index in the stretching direction (i.e., x direction), it has no reflective ability due to no difference in the refractive index in the direction (i.e., y direction) perpendicular to the uniaxial stretching direction on the film surface, so that it is possible for the film to have polarizing characteristics that reflect light only in a certain direction.

The stretching in the x direction may be carried out by 3 to 7 times, preferably by 4 to 6 times. In such event, the x direction may be the first direction, and the direction perpendicular to the x direction may be the second direction.

The difference in the refractive index between the first layer and the second layer in the x direction by the stretching may be 0.01 or more, 0.1 or more, or 0.1 to 0.5, preferably 0.2 to 0.4. If the difference in the refractive index in the x direction is within the above range, the reflective performance can be efficiently enhanced.

The differences in the refractive index between the first layer and the second layer in the direction (y direction) perpendicular to the uniaxial stretching direction on the film surface and in the film thickness direction (z direction) may be 0.1 or less, or 0.05 or less, preferably 0.04 or less, more preferably 0.03 or less, respectively. If the differences in the refractive index in the y direction and in the z direction is 0.1 or less, or 0.05 or less, the color deviation when polarized light is incident at an oblique angle can be suppressed.

The thickness of the first layer and that of the second layer may be continuously varied such that the ratio of the maximum layer thickness to the minimum layer thickness of each layer is 1.2 to 1.5 times.

In addition, the primary stretching direction of the polarizing reflective layer may correspond to the transverse direction of the optical polyester film disposed on at least one side of the polarizing reflective layer. That is, the primary stretching direction of the polarizing reflective layer and the transverse direction of the optical polyester film may substantially coincide. Thereby, the polarizing reflective sheet may have improved brightness.

As described above, the optical polyester film has improved mechanical strength such as modulus and improved brightness while minimizing the generation of polarization unevenness by minimizing the difference in the orientation angle between the center and the edge of the film while generating a difference between the strengths in the longitudinal/transverse directions of the film. Thus, it can be advantageously used as a protective film for the polarizing reflective sheet. Further, since the optical polyester film is in a single layer, the process for manufacturing the same is more convenient, and it is thinner in thickness. Hence, it can be advantageously used in a small and thin display device.

MODE FOR THE INVENTION

Hereinafter, the present invention is explained in detail by the following Examples. The following Examples are intended to further illustrate the present invention. The scope of the invention is not limited thereto.

EXAMPLE AND COMPARATIVE EXAMPLE

Example 1

A polyethylene terephthalate resin (composed of 100% by mole of ethylene glycol and 100% by mole of terephthalic acid with an IV of 0.61 dl/g, SKC) was melt extruded through an extruder at about 280° C. and then cooled on a casting roll at about 25° C. to prepare an unstretched sheet. The unstretched sheet was preheated at 100° C. and stretched by about 1.20 times in the longitudinal direction at 80° C. and then by 4.16 times in the transverse direction at a temperature elevated from 80° C. to 120° C. stepwise. Thereafter, the stretched sheet was heat set at about 210° C. for about 90 seconds and relaxed by about 3% by lowering the temperature from about 150° C. to about 100° C., to thereby prepare a single-layered film having a thickness of 188 μm.

Examples 2 to 9 and Comparative Examples 1 and 2

Single-layered films were each prepared in the same manner as in Example 1, except that the stretch ratios in the longitudinal and transverse directions and the thickness of the final film were changed as shown in Table 1 below.

Comparative Example 3

A commercially available film (SRF; Toyobo Co., Ltd.) was used.

PREPARATION EXAMPLE

Preparation Example 1: Prism Sheet

A resin for forming an optical pattern (PM472; CCTech Inc.) was coated on each of the films of Examples 1 to 9 and Comparative Examples 1 and 2, a mold was applied thereto, and an ultraviolet ray was irradiated to form a prism pattern layer, thereby preparing a prism sheet. In such event, the pitch of the pattern was 0.05 mm, and the height thereof was 0.025 mm. The prism pattern thus formed has a triangular prism shape extending in one direction. That is, the prism pattern has two inclined surfaces intersecting with each other (perpendicular to each other) and has a mountain shape extending in one direction.

Preparation Example 2: Polarizing Reflective Sheet

Each of the films of Examples 1 to 5 and Comparative Examples 1 to 3 was attached to one side or both sides of a Vikuiti™ multi-layer stretched film of 3M, to thereby prepare a polarizing reflective sheet.

Test Example (1) Evaluation of Modulus

The films prepared in the Examples and the Comparative Examples were measured for the elastic modulus in the longitudinal direction and that in the transverse direction with a universal testing machine 4260-001 (Instron) in accordance with ASTM D 882. The results are shown in Table 1 below.

(2) Evaluation of Tensile Strength

A load was applied to each of the films of the Examples and the Comparative Examples to measure the tensile strength by dividing the maximum load when the film was stretched by the original cross-sectional area of the film. The results are shown in Table 1 below.

(3) Evaluation of Optical Axis

The films of the Examples and the Comparative Examples were each measured for the orientation angle thereof using an orientation angle measuring system as depicted in FIG. 1. The deviation in the angle (i.e., optical axis) between the measured orientation angle and the transverse direction was obtained. The results are shown in Table 1 below.

(4) Evaluation of In-Plane Retardation

The films of the Examples and the Comparative Examples were each measured for the refractive indices (nx and ny) in two mutually perpendicular directions and the refractive index (nz) in the thickness direction with an Abbe refractometer (NAR-4T available from Atago Co., Ltd.; at a measurement wavelength of 589 nm). The thickness d (nm) of the film was measured with an electronic micrometer (Millitron 1245D available from Feinpruef), which was converted to the nm unit. The absolute value (|nx−ny|) of the difference in the refractive indices in the two perpendicular directions was obtained and multiplied by the thickness d (nm) to obtain an in-plane retardation (Re) as the product (Δnxy d). The results are shown in Table 1 below.

(5) Observation of Polarization Unevenness

The films of the Examples and the Comparative Examples were each laminated on one side of a polarizer made of PVA and iodine such that the absorption axis of the polarizer and the main orientation axis of the film were perpendicular to each other. Then, a TAC film (80 μm, Fuji Film Co., Ltd.) was laminated on the opposite side to thereby prepare a polarizing plate. The polarizing plate was mounted on the light emitting side of a liquid crystal display device that employed a white LED as a light source (NSPW500CS, Nichia Corporation) composed of light emitting elements in which a blue light emitting diode and an yttrium-aluminum-garnet yellow fluorescent were combined. Here, the sample film was placed on the viewer side. The liquid crystal display device also had a polarizing plate having two TAC films as a protective film for a polarizer and disposed on the light incident side of the liquid crystal cells (see FIG. 2). The presence or absence of polarization unevenness was checked by observing the polarizing plate of the liquid crystal display device with the naked eye from the front and oblique directions. The results are shown in Table 1 below.

(6) Evaluation of Cut Surface

The films were each cut with a cutter in the form of a rectangular frame. Thereafter, the cut surface was visually observed by the naked eye and through an optical microscope. If residues such as burrs were observed on the cut surface, it was evaluated as poor. If no burr was observed on the cut surface, it was evaluated as good.

(7) Enhancement Rate of Brightness

The prism sheet as prepared in Preparation Example 1 was disposed on a backlight source including a light guide plate. Then, the brightness of light that passed through the prism sheet was measured with CS-2000 of Minolta. Here, the enhancement rate (%) of brightness was calculated with reference to the brightness of Comparative Example 1. The results are as shown in Table 2 below.

In addition, the enhancement rate of the brightness of the polarizing reflective sheet of Preparation Example 2 was determined in the same manner as described above. The results are shown in Table 3 below.

optical axis) in the orientation angle of less than 2.8 degrees and a high in-plane retardation of 7,000 nm or more, without the generation of polarization unevenness. Further, they were excellent in the cutting processability.

In contrast, the films of Comparative Examples 1 to 3 had a high deviation in the orientation angle and a low in-plane retardation with the strong presence of polarization unevenness. The enhancement rates of brightness thereof were lower than those of the films of the Examples. In addition, as shown in Tables 2 and 3 above, the prism sheets and the polarizing reflective sheets that employed the films of the Examples had excellent enhancement rates of brightness as compared with those which employed the films of the Comparative Examples.

TABLE 1

| | Thickness (μm) | Stretching ratio (times) MD | Modulus (kgf/mm$^2$) TD | Tensile stength (MD/TD) | Ratio axis MD | Optical IPR* MD | TD | TD) | (deg.) | (Rc) | PU* | CS* |
|---|---|---|---|---|---|---|---|---|---|---|---|---|
| Ex. 1 | 188 | 1.20 | 4.16 | 228.2 | 500.8 | 9.2 | 28.4 | 0.32 | 1.6 | 17563.0 | None | G |
| Ex. 2 | 145 | 1.30 | 4.34 | 255.7 | 517.2 | 9.8 | 32.3 | 0.30 | 1.5 | 15232.0 | None | G |
| Ex. 3 | 100 | 1.30 | 4.44 | 252.9 | 532.1 | 9.1 | 30.8 | 0.30 | 1.9 | 11052.0 | None | G |
| Ex. 4 | 100 | 1.50 | 4.44 | 264.3 | 528.9 | 9.8 | 32.8 | 0.30 | 2.2 | 10523.0 | None | G |
| Ex. 5 | 80 | 1.30 | 4.42 | 266.8 | 544.6 | 10.0 | 34.1 | 0.29 | 1.8 | 7929.0 | None | G |
| Ex. 6 | 40 | 1.00 | 4.25 | 233.2 | 461.8 | 8.1 | 29.8 | 0.27 | 1.2 | 4215.2 | V | P |
| Ex. 7 | 43 | 1.20 | 4.25 | 252.3 | 440.4 | 8.6 | 30.2 | 0.28 | 1.8 | 4852.1 | V | P |
| Ex. 8 | 75 | 1.20 | 4.20 | 238.8 | 475.3 | 10.6 | 32.1 | 0.33 | 1.7 | 7956.3 | None | G |
| Ex. 9 | 50 | 1.50 | 4.25 | 274.3 | 484.4 | 11.7 | 34.2 | 0.34 | 2.4 | 5742.3 | V | G |
| C. Ex. 1 | 100 | 3.10 | 4.25 | 382.7 | 435.7 | 19.6 | 26.0 | 0.75 | <25-30 | 4691/0 | SV | G |
| C. Ex. 2 | 70 | 3.20 | 4.15 | 378.0 | 445.0 | 20.1 | 27.2 | 0.74 | 28.0 | 3426.0 | SV | G |
| C. Ex. 3 | 80 | Uniaxially stretched | | 221.1 | 583.0 | 8.2 | 24.7 | 0.33 | 2.5 | 8480.0 | None | P |

*IPR: in-plane retardation; PU: polarization unevenness; CS: surface cut in the transverse direction; V: slightly visible; SV: strongly visible, G: Good, P:Poor

TABLE 2

Enhancement rate of brightness of prism sheet (%)

| Ex. 1 | 106.6 |
|---|---|
| Ex. 2 | 106.8 |
| Ex. 3 | 106.2 |
| Ex. 4 | 105.8 |
| Ex. 5 | 106.7 |
| Ex. 6 | 106.8 |
| Ex. 7 | 105.9 |
| Ex. 8 | 106.1 |
| Ex. 9 | 104.3 |
| C. Ex. 1 | 100 |
| C. Ex. 2 | 101 |

TABLE 3

Enhancement rate of brightness of polarizing reflective sheet (%)

| | Both sides | One side |
|---|---|---|
| Ex. 1 | 106.6 | 103.6 |
| Ex. 2 | 106.8 | 103.8 |
| Ex. 3 | 106.2 | 103.5 |
| Ex. 4 | 107.2 | 103.8 |
| Ex. 5 | 106.7 | 103.9 |
| C. Ex. 1 | 100.0 | 100.0 |
| C. Ex. 2 | 100.2 | 100.1 |
| C. Ex. 3 | 104.1 | 102.3 |

As confirmed from the results shown in Table 1 above, all of the films prepared in the Examples were excellent in tensile strength and modulus and had a low deviation (or

DESCRIPTION OF THE NUMERALS

30: liquid crystal display device
31: liquid crystal panel
311: upper polarizing plate
311': lower polarizing plate
312: color filter substrate
313: liquid crystal layer
314: TFT substrate
32: backlight unit
40: organic electroluminescent display device
41: organic EL panel
411: organic EL substrate
412: driving substrate
42: front polarizing plate
50: prism sheet
51: prism pattern layer
511: protrusion part
512: prism pattern
52: base film
60: polarizing reflective sheet
61: polarizing reflective layer
62, 62': protective film

The invention claimed is:

1. An optical polyester film, which is a uniaxially or biaxially stretched polyester film and has an in-plane retardation of 7,000 nm to 30,000 nm, a tensile strength in the transverse direction (TD) of 25 to 35 kgf/mm$^2$, a tensile strength in the longitudinal direction (MD) of 8.0 to 19 kgf/mm$^2$, a ratio of the tensile strength in the longitudinal direction to the tensile strength in the transverse direction of 0.25 to 0.7, an elastic modulus in the transverse direction of 450 to 560 kgf/mm$^2$, and an elastic modulus in the longitudinal direction of 220 to 380 kgf/mm$^2$, wherein a stretching ratio of the polyester film is 1.2 times to 1.7 times in the longitudinal direction, wherein a stretching ratio of the polyester film is 4.1 times to 6.0 times in the transverse direction, and wherein the optical polyester film has a deviation in the retardation of 500 nm/m or less along a single axis, a shrinkage in the longitudinal direction of 0.05 to 0.6% and a shrinkage in the transverse direction of 0.05 to 0.6%, when measured under the conditions of 24 hours at 85° C., an elongation at breakage of 7% to 20% in the longitudinal direction, and an elongation at breakage of 75% to 100% in the transverse direction.

2. The optical polyester film of claim 1, which has an orientation angle which deviates from a transverse direction of the film by ±2.8 degrees or less in its entire width.

3. A prism sheet, which comprises a polyester base film and a prism pattern layer disposed on the polyester base film, wherein the polyester base film is a uniaxially or biaxially stretched polyester film and has an in-plane retardation of 7,000 nm to 30,000 nm, a tensile strength in the transverse direction (TD) of 25 to 35 kgf/mm$^2$, a tensile strength in the longitudinal direction (MD) of 8.0 to 19 kgf/mm$^2$, a ratio of the tensile strength in the longitudinal direction to the tensile strength in the transverse direction of 0.25 to 0.7, an elastic modulus in the transverse direction of 450 to 560 kgf/mm$^2$, and an elastic modulus in the longitudinal direction of 220 to 380 kgf/mm$^2$, wherein a stretching ratio of the polyester base film is 1.2 times to 1.7 times in the longitudinal direction, wherein a stretching ratio of the polyester film is 4.1 times to 6.0 times in the transverse direction, and wherein the polyester base film has a deviation in the retardation of 500 nm/m or less along a single axis, a shrinkage in the longitudinal direction of 0.05 to 0.6% and a shrinkage in the transverse direction of 0.05 to 0.6%, when measured under the conditions of 24 hours at 85° C., an elongation at breakage of 7% to 20% in the longitudinal direction, and an elongation at breakage of 75% to 100% in the transverse direction.

4. The prism sheet of claim 3, wherein the prism pattern layer extends in one direction, and the stretching direction of the polyester base film corresponds to the extending direction of the prism pattern layer.

5. A polarizing reflective sheet, which comprises a polyester base film and a polarizing reflective layer disposed on the polyester base film, wherein an isotropic resin layer and a birefringent resin layer are alternately laminated in the polarizing reflective layer, and the polyester base film is a uniaxially or biaxially stretched polyester film and has an in-plane retardation of 7,000 nm to 30,000 nm, a tensile strength in the transverse direction (TD) of 25 to 35 kgf/mm$^2$, a tensile strength in the longitudinal direction (MD) of 8.0 to 19 kgf/mm$^2$, a ratio of the tensile strength in the longitudinal direction to the tensile strength in the transverse direction of 0.25 to 0.7, an elastic modulus in the transverse direction of 450 to 560 kgf/mm$^2$, and an elastic modulus in the longitudinal direction of 220 to 380 kgf/mm$^2$, wherein a stretching ratio of the polyester base film is 1.2 times to 1.7 times in the longitudinal direction, wherein a stretching ratio of the polyester film is 4.1 times to 6.0 times in the transverse direction, and wherein the polyester base film has a deviation in the retardation of 500 nm/m or less along a single axis, a shrinkage in the longitudinal direction of 0.05 to 0.6% and a shrinkage in the transverse direction of 0.05 to 0.6%, when measured under the conditions of 24 hours at 85° C., an elongation at breakage of 7% to 20% in the longitudinal direction, and an elongation at breakage of 75% to 100% in the transverse direction.

6. The polarizing reflective sheet of claim 5, wherein the difference in the refractive index between the isotropic resin layer and the birefringent resin layer is 0.1 or more in a first direction and 0.1 or less in a second direction that is perpendicular to the first direction, and the first direction is the transverse direction of the polyester base film.

\* \* \* \* \*